July 3, 1945.  E. P. LONGERICH  2,379,730
ANODE RING MOTOR
Original Filed July 16, 1942  2 Sheets-Sheet 1
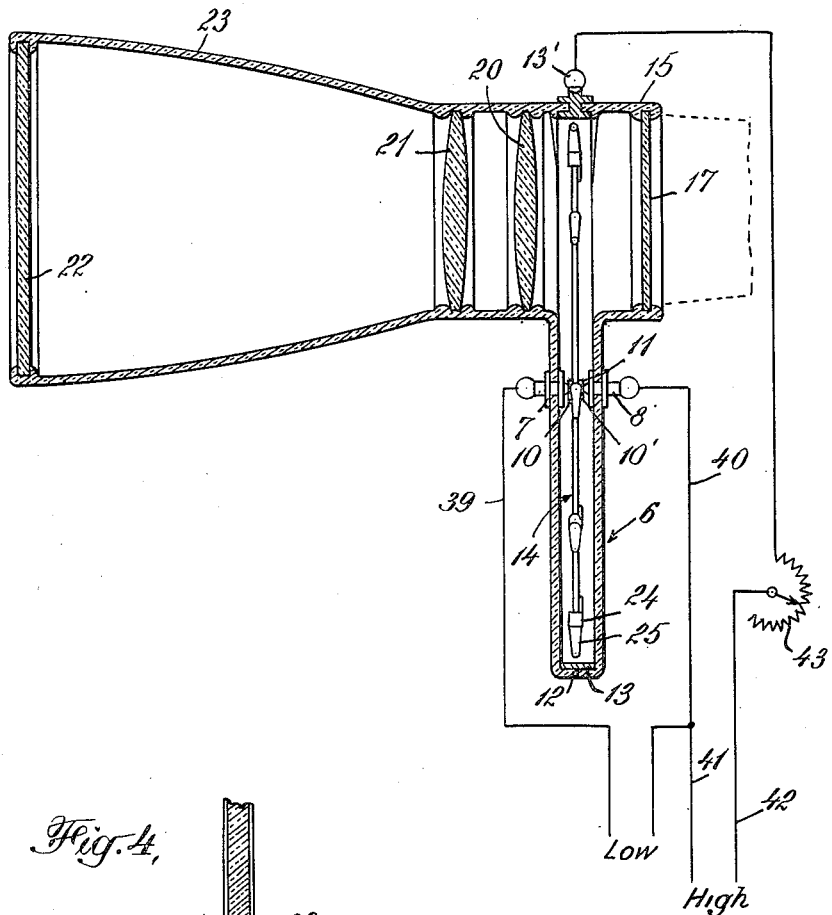
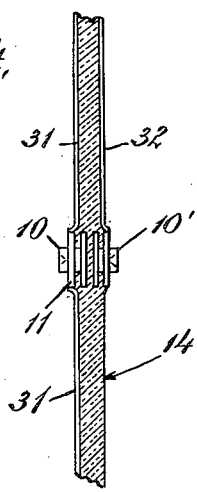
INVENTOR
Ernest P. Longerich
BY
Luther W Hawley
ATTORNEY July 3, 1945.  E. P. LONGERICH  2,379,730
ANODE RING MOTOR
Original Filed July 16, 1942   2 Sheets-Sheet 2
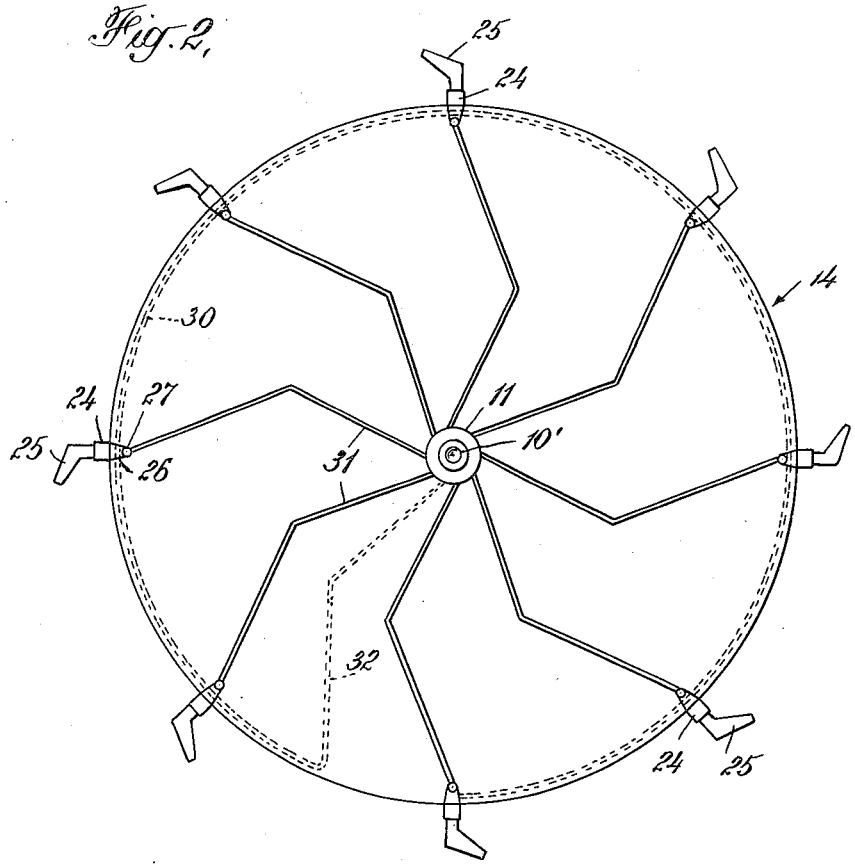
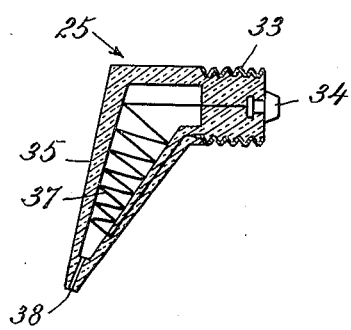
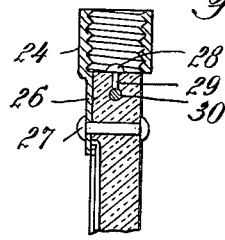
INVENTOR
Ernest P. Longerich
BY
Luther W. Hawley
ATTORNEY Patented July 3, 1945

2,379,730

UNITED STATES PATENT OFFICE 2,379,730

ANODE RING MOTOR

Ernest P. Longerich, Mahwah, N. J.

Original application July 16, 1942, Serial No. 451,182, now Patent No. 2,335,287, dated November 30, 1943. Divided and this application October 2, 1943, Serial No. 504,709

4 Claims. (Cl. 172—36)

This invention relates to an anode ring motor.

The invention has for its salient object to provide a simple and practical motor of the type described.

Further objects of the invention will appear from the following specification taken in connection with the drawings which form a part of this application, and in which.

Fig. 1 is a sectional elevation of television apparatus having an anode ring driving motor constructed in accordance with the invention and illustrating diagrammatically the motor circuits;

Fig. 2 is an enlarged side elevation of the scanner disk which forms the rotor or wheel of the anode ring motor;

Fig. 3 is a fragmentary enlarged section showing one of the sockets for receiving the primary electron emitter;

Fig. 4 is a fragmentary sectional elevation through the rotor or scanner disk; and Fig. 5 is an enlarged section of one of the primary electron emitters.

This application is a division of application Serial No. 451,182, filed July 16, 1942, patented November 30, 1943, Patent No. 2,335,287, for Television apparatus, and the anode ring motor has therefore been illustrated and described as driving means for the scanner disk of such apparatus. It should be understood, however, that the motor is not limited to such use.

The television apparatus of which, in the present instance, the anode ring motor forms a driving motor, may be briefly described as comprising an evacuated envelope or housing 6 having axially alined electrodes 7 and 8 at the center of the housing and securing to the housing walls. The electrodes have pointed shafts which are received in sockets 10 and 10' formed in opposite sides of the color scanner disk hub 11. The electrodes are sealed in place and insulated from the walls of the housing 6.

The inner peripheral wall 12 of the housing 6 is engaged by an anode ring 13 which is continuous and has a post portion 13' projecting through an upper part of the peripheral wall 12. The periphery of the scanner disk 14, such as an R. C. A. color scanner disk, is radially and concentrically spaced within and from the anode ring 13.

The housing 6 is extended, as shown at 15, and a clear glass 17 is mounted in the extension.

Axially with the extension 15 is another larger and longer extension 23 having a viewing screen 22 and enlarging lenses 20 and 21 between the scanner disk and screen 22.

The color scanning disk 14 has any suitable or conventional color filter areas and is provided on its periphery at equally circumferentially spaced intervals with radial sockets 24, in which primary electron emitters 25 are mounted to project in a direction opposite to the direction of rotation of the scanner disk.

The sockets each comprise a mounting arm 26 extending along one side of the disk and fastened as at 27. A center contact 28 in the socket is electrically connected at 29 to conductor 30 embedded in the disk near its peripheral edge. The piece 26 is electrically connected to the socket 10 by one of the wires 31. One end of the conductor 30 is connected to the last socket in the series, with the opposite end connected by the wire 32 to the socket 10'. The sockets 10 and 10' are embedded in the disk, as shown in Fig. 4 of the drawings.

The primary emitters 25 each comprise a high heat resistant quartz glass body having a screw ferrule equipped base portion 33 having a center contact 34 to engage the center contact 28 of the socket with the ferrule engaging the socket 24. An acutely angulated hollow conical head 35 is formed on the base portion and has in its small end a minute pin-point passage or orifice 38 through which the electrons generated and confined in the interior of the head are jetted in a path substantially tangential to the periphery of the scanner disk, to cause the disk to rotate in the opposite direction at high speed. The head 35 encloses a spiral conical resistor 37 which has one side connected to the center contact 34 and the other side connected to the ferrule 33. The resistor wire may be of tungsten and coated with thorium oxide.

Referring to Fig. 1 of the drawings, the numeral 39 designates a wire connecting the electrode 7 with the positive side of a low voltage source. The electrode 8 is connected by the wire 40 with the negative side of the same source. A branch wire 41 connects the wire 40 with the negative side of a high voltage source, such as the secondary of a high voltage transformer (not shown). The positive side of the high voltage source is connected by the wire with the post 13' of the anode ring 12. A rheostat 43 is connected in the wire 42 to enable varying the energization of the anode ring and the electron emitters to control the speed of rotation of the color scanner disk 14. The amount of high voltage employed affects the speed of the disk 14 which may run at speeds of about 20,000 revolutions per minute.

It is to be observed that the starting and the uniform speed of the scanner disk 14 is controlled by a synchronized generator, not shown, energizing the high voltage current source.

As hereinbefore stated, the anode ring motor is not limited to use with television apparatus and may be used as a driving motor for any desired purpose.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, a rotatably mounted wheel, a substantially circular housing therefor, primary electron emitting means mounted on the periphery of said wheel, a stationary anode ring spaced from and surrounding the periphery of said wheel and anchored to the inner face of said housing, and means connected to said ring and emitting means for energizing said electron emitting means to cause rotation of said wheel.

2. In combination, a rotatably mounted wheel, a substantially circular housing therefor, primary electron emitting means mounted on the periphery of said wheel, a stationary anode ring spaced from and surrounding the periphery of said wheel and anchored to the inner face of said housing, and means connected to said ring and emitting means for energizing said electron emitting means to cause rotation of said wheel, said wheel being mounted for rotation on a plurality of electrodes forming opposed bearings therefor in circuit with said electron emitting means.

3. In combination, a rotatably mounted wheel, a substantially circular housing therefor, primary electron emitting means mounted on the periphery of said wheel, a stationary anode ring spaced from and surrounding the periphery of said wheel and anchored to the inner face of said housing, and means connected to said ring and emitting means for energizing said electron emitting means to cause rotation of said wheel and to predeterminedly control the speed of rotation thereof.

4. In combination, a rotatable disk and operating means therefor comprising an anode ring spaced peripherally and extending laterally therefrom at both sides and surrounding the disk, primary electron emitters mounted on the periphery of said disk and substantially tangent thereto and extending in a direction opposite to the direction of rotation of the disk, and means connected to said ring and emitting means for energizing said primary electron emitters.

ERNEST P. LONGERICH.